United States Patent
Cattani

(10) Patent No.: US 11,404,952 B2
(45) Date of Patent: Aug. 2, 2022

(54) CIRCUIT, CORRESPONDING MULTI-PHASE CONVERTER DEVICE INCLUDING A PLURALITY OF SWITCHING STAGES AND METHOD OF OPERATION FOR CHARGING AND DISCHARGING A CAPACITOR DEPENDENT ON SWITCHING STAGE OPERATING TRANSITION

(71) Applicant: STMicroelectronics S.r.l., Agrate Brianza (IT)

(72) Inventor: Alberto Cattani, Cislago (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 43 days.

(21) Appl. No.: 16/916,335

(22) Filed: Jun. 30, 2020

(65) Prior Publication Data
US 2021/0006163 A1    Jan. 7, 2021

(30) Foreign Application Priority Data
Jul. 2, 2019    (IT) ................ 102019000010662

(51) Int. Cl.
H02M 3/158    (2006.01)
H02M 1/00    (2006.01)

(52) U.S. Cl.
CPC ....... *H02M 1/0025* (2021.05); *H02M 3/1584* (2013.01); *H02M 1/0032* (2021.05)

(58) Field of Classification Search
CPC ................ H02M 3/155–1588; H02M 1/0025
See application file for complete search history.

(56) References Cited

U.S. PATENT DOCUMENTS

| 2007/0262756 A1* | 11/2007 | Valley | H02M 3/1584 |
| | | | 323/234 |
| 2009/0224731 A1* | 9/2009 | Tang | H02M 3/1584 |
| | | | 323/241 |
| 2012/0176105 A1 | 7/2012 | Chang et al. | |
| 2018/0294721 A1 | 10/2018 | Abe | |

FOREIGN PATENT DOCUMENTS

DE    102005002570 A1    7/2006

OTHER PUBLICATIONS

IT Search Report and Written Opinion for IT Appl. No. 102019000010662 dated Mar. 11, 2020 (8 pages).

* cited by examiner

*Primary Examiner* — Peter M Novak
(74) *Attorney, Agent, or Firm* — Crowe & Dunlevy

(57) ABSTRACT

A first switch couples an input node receiving a main control signal for a main switching stage of a multi-phase converter to an output node delivering a secondary control signal for a secondary switching stage following actuation of the secondary switching stage. A second switch couples the output node to a capacitor during a time period of actuation/deactuation of the secondary switching stage. Current is sourced to the capacitor during the actuation time period or sunk from the capacitor during the deactuation time period. The sourced or sunk current may be generated proportional to the main control signal.

28 Claims, 2 Drawing Sheets

CIRCUIT, CORRESPONDING MULTI-PHASE CONVERTER DEVICE INCLUDING A PLURALITY OF SWITCHING STAGES AND METHOD OF OPERATION FOR CHARGING AND DISCHARGING A CAPACITOR DEPENDENT ON SWITCHING STAGE OPERATING TRANSITION

PRIORITY CLAIM

This application claims the priority benefit of Italian Application for Patent No. 102019000010662, filed on Jul. 2, 2019, the content of which is hereby incorporated by reference in its entirety to the maximum extent allowable by law.

TECHNICAL FIELD

The description relates to multi-phase electronic converters, e.g., DC/DC converter devices.

In particular, one or more embodiments relate to techniques for managing transitions of a multi-phase DC/DC converter between different operating states (e.g., managing powering up phase adding and powering down—phase shedding—of secondary phases).

BACKGROUND

Electronic converters such as DC/DC converters are widely used in many applications to generate the supply voltage levels required for the operation of sophisticated electronic systems, such as smart phones, laptops or other devices. A stable and precise supply voltage provided at the output of a converter may also facilitate matching the performance expected from such electronic systems.

In many applications, converters may be designed considering power efficiency, e.g., in order to reduce energy consumption.

For instance, low energy consumption of converters may facilitate increasing the operating life duration of battery-supplied electronic devices.

In the case of cable-powered devices, low energy consumption may be beneficial, e.g., resulting in reduction of thermal stresses due to power dissipation.

Some applications may involve a wide range of output current capability from an electronic converter. In order to provide satisfactory power efficiency of the converter over the entire output current range, multi-phase DC/DC converters have been developed in order to avoid at the same time high currents flowing in the transistors (e.g., MOS transistor) and in the components external to the converter.

A multi-phase DC/DC converter comprises two or more switching stages coupled (e.g., in parallel) at the output node of the converter, each of said switching stages being controlled by a respective PWM-generating circuit. Typically, a main phase (i.e., a main switching stage) of the converter operates when the output load current is low, and at least one secondary phase may be activated as a result of an increase of the output current. In the latter case, each of the activated phases sources a fraction of the total output current.

In such multi-phase DC/DC converters, transitions between different operating states (wherein each state corresponds to a different set of phases activated, and a transition comprises powering up or powering down at least one secondary phase) should be properly managed.

Both powering up and powering down of a secondary phase may affect the performance of the converter, thereby possibly generating issues for the whole application (i.e., the converter and/or the electronic device supplied thereby).

Fast transitions may be desired in order to rapidly respond to a variation of the output load current and avoid regulation losses, e.g., due to the limited output current capability of a single phase (e.g., the main phase) of the converter.

Conversely, a transition that occurs too quickly may result in undesired responses (e.g., spikes) of the output voltage. Therefore, timing requirements of said transitions should be subject to a trade-off in order to provide improved performance in a variety of different operating conditions of the converter, for instance, different values of the input voltage Vin, of the output voltage Vout, of the output load current, as well as possible process, voltage and temperature (PVT) variations, and others.

Despite the extensive activity in the area, further improved solutions are desirable.

There is a need in the art to contribute in providing such improved solutions.

SUMMARY

One or more embodiments may relate to a corresponding multi-phase converter device.

One or more embodiments may relate to a corresponding method of operating the circuit or the multi-phase converter device.

One or more embodiments may provide a circuit configured to generate a control signal for a secondary switching stage in a multi-phase converter device, wherein the circuit is configured to generate said control signal for a secondary switching stage as a function of the control signal for the main switching stage.

One or more embodiments may thus facilitate providing a selected timing for powering up and powering down a secondary phase of a multi-phase converter, thereby matching wide output current capability requirements with small transients at the output voltage during transitions.

One or more embodiments may facilitate providing such transition timing independent from the operating conditions of the converter.

BRIEF DESCRIPTION OF THE DRAWINGS

One or more embodiments will now be described, by way of example only, with reference to the annexed figures, wherein.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

Throughout the figures annexed herein, like parts or elements are indicated with like references/numerals and a corresponding description will not be repeated for brevity.

The references used herein are provided merely for convenience and hence do not define the extent of protection or the scope of the embodiments.

Figure 1:
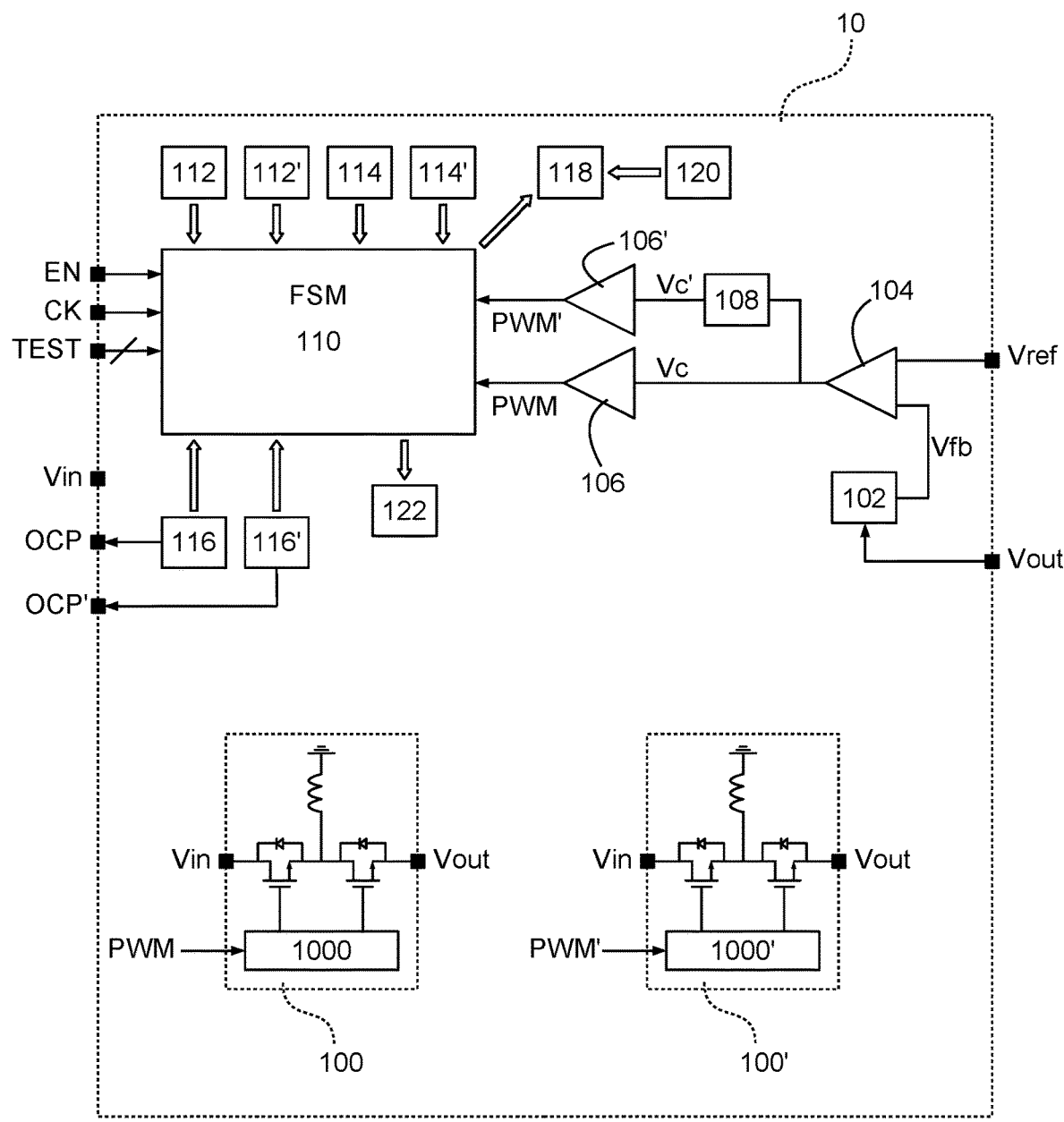
FIG. 1 is a circuit block diagram exemplary of a multi-phase converter.

By way of introduction to a detailed description of exemplary embodiments, reference may first be made to FIG. 1 illustrating a circuit block diagram exemplary of a two-phase DC/DC converter. In the present detailed description, reference is made to the exemplary case of a two-phase converter by way of simplicity only. One or more embodiments may apply generally to multi-phase converters having two or more phases (i.e., a main phase and at least one secondary phase).

As exemplified in FIG. 1, a two-phase DC/DC converter 10 may comprise a first switching stage 100, a second switching stage 100', and control circuitry coupled thereto.

Each of the switching stages 100 and 100' may comprise a respective half-bridge arrangement comprising a high-side switch and a low-side switch (e.g., MOS transistors), a respective reactive component (e.g., an inductor) coupled to the half-bridge arrangement, and respective driving circuitry 1000, 1000' coupled to the high-side and low-side switches to control switching thereof according to respective PWM-modulated signals PWM, PWM'. The switching stages 100, 100' may be configured to receive an input voltage Vin and to generate an output voltage Vout of the converter 10. For instance, in one or more embodiments, the switching stages 100, 100' may be implemented according to a conventional buck, boost or buck-boost topology.

The control circuitry in the converter 10 may comprise a (e.g., resistive) voltage divider 102 configured for generating a feedback voltage signal Vfb by division of the output voltage Vout. The control circuitry may comprise an error amplifier 104 configured for determining a difference between the feedback voltage signal Vfb and a reference voltage signal Vref, thereby generating a first control signal Vc indicative of the determined difference for controlling operation of the converter 10.

The first control signal Vc may be compared with a periodic ramp signal (e.g., a triangular or saw-tooth signal) in a first comparator 106, thereby generating a first output oscillating signal PWM (e.g., a first pulse width modulated signal) for controlling the switching operation of the first switching stage 100.

In a two-phase converter 10 as exemplified in FIG. 1, the first control signal Vc may be provided at the input of a phase management circuit block 108, with the phase management circuit block 108 being configured to generate at output a second control signal Vc'. The second control signal Vc' may be compared with a periodic ramp signal in a second comparator 106', thereby generating a respective output oscillating signal PWM' for controlling the switching operation of the second switching stage 100'. Therefore, in one or more embodiments the phase management circuit block 108 may be configured to generate the second control signal Vc' so as to result in transition timing between different operating states of the converter 10 (i.e., operating with one phase only, or with both phases in parallel) being independent from the operating conditions of the converter.

As exemplified in FIG. 1, the signals PWM and PWM' may be provided as input to a finite state machine (FSM) circuit block 110 in the converter 10, the finite state machine 110 possibly being configured to receive input signals (also) from:

a first discontinuous mode detector (DMD) comparator 112 configured to detect whether the inductor current in the first switching stage 100 reaches a certain threshold (e.g., zero), a second DMD comparator 112' configured to detect whether the inductor current in the second switching stage 100' reaches a certain threshold (e.g., zero), a first comparator skip block 114 configured to control transitions of the first phase to a pulse-skip mode, a second comparator skip block 114' configured to control transitions of the second phase to a pulse-skip mode, a first overcurrent protection OCP circuit block 116 configured to limit the inductor current in the first switching stage 100 to a maximum value, a second OCP circuit block 116' configured to limit the inductor current in the second switching stage 100' to a maximum value, and signals (e.g., digital signals) external to the converter 10 such as an enable signal EN, a clock signal CK, and a test signal TEST.

The finite state machine circuit block 110 may be configured to control a ramp generator circuit block 118 which may generate ramp signals for application to the first comparator 106 and the second comparator 106'. The ramp generator circuit block 118 may receive additional input signal(s) from a high-side current sensing circuit block 120, which may be configured to sense the current flowing in the first switching stage 100 and in the second switching stage 100'.

The finite state machine circuit block 110 may additionally be configured to control a ring killer circuit block 122 configured to be powered on as a result of the respective phase going in pulse-skip mode.

Figure 2:
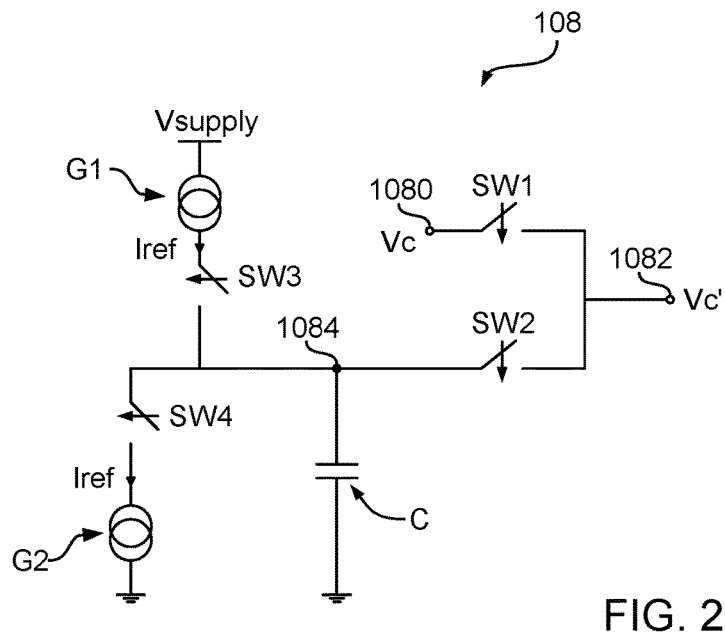
FIG. 2 is a circuit diagram exemplary of a circuit for managing state transitions in a multi-phase converter.

FIG. 2 is a circuit diagram exemplary of a possible implementation of a phase management circuit block 108 for generating the second control signal Vc' and managing transitions between operating states of the two-phase converter 10.

The phase management circuit block 108 as exemplified in FIG. 2 may comprise an input node 1080 for receiving the first control signal Vc and an output node 1082 for providing the second control signal Vc', wherein:

the output node 1082 is selectively couplable to the input node 1080 via an electronic switch SW1, the output node 1082 is selectively couplable to an intermediate node 1084 via an electronic switch SW2, and a capacitive component C (e.g., a capacitor) is coupled between the intermediate node 1084 and a reference (ground) node GND.

The capacitor C is configured to be:

charged by means of a current generator G1 selectively couplable between a supply node Vsupply and the intermediate node 1084 via an electronic switch SW3 to inject a constant reference current Iref into the capacitor C, and discharged by means of a current generator G2 selectively couplable between the intermediate node 1084 and the reference (ground) node GND via an electronic switch SW4 to sink a constant reference current Iref from the capacitor C.

Therefore, operation of a circuit 108 as exemplified in FIG. 2 may be summarized as follows:

during a time period of activation of a secondary phase of the converter 10, switches SW2 and SW3 may be closed and switches SW1 and SW4 may be open, thereby resulting in the secondary control signal Vc' increasing from 0 V to Vc (with Vc being the steady-state value of the control voltage of the entire loop of the converter 10) with a constant-slew ramp resulting from the capacitor C being charged with a constant current Iref;

when the power-up transition of the secondary phase is terminated (i.e., when Vc'=Vc; the activation time period ends), switch SW2 may be opened and switch SW1 may be closed, thereby coupling the output node 1082 to the input node 1080 and propagating to the second comparator 106' the main control voltage Vc of the entire DC/DC control loop;

during a time period of deactivation of the secondary phase, switches SW2 and SW4 may be closed and switches SW1 and SW3 may be opened, thereby resulting in the secondary control signal Vc' decreasing from Vc to 0 V with a constant-slew ramp resulting from the capacitor C being discharged with a constant current Iref; and when the power-down transition of the secondary phase is terminated (i.e., when Vc'=0 V; the deactivation time period ends), switches SW2 and SW4 may be kept closed to maintain the secondary control signal Vc'=0 V.

Alternatively, the capacitor C may be charged/discharged using a switched current, e.g., in case the overall value to be obtained is lower than the reference current Iref available in the system. A switched current may be obtained by arranging an electronic switch in series with the current generator providing the reference current Iref, the electronic switch being alternatively activated and deactivated (i.e., made conductive and non-conductive, respectively) with a certain duty-cycle D (with D being comprised between 0 and 1). Therefore, the average value of the switched current may be equal to Iref*D, thus lower than Iref.

The phase management circuit 108 as exemplified in FIG. 2 may not allow to achieve a well-defined timing for power-up and power-down transitions of the second phase of the converter 10, especially in case of variations of the operating point of the converter due to changes of the input voltage Vin, the output voltage Vout and output current.

In fact, a variation of the operating conditions may result in a variation of the control voltage signal Vc. A circuit as exemplified in FIG. 2 may operate with power-up and power-down timings which are proportional to the value of the control signal Vc itself. Therefore, the overall transition time may not be optimized in a circuit as exemplified in FIG. 2, which may require a design trade-off possibly resulting in a poor performance on output voltage regulation or on fast recovery on variations of the output current capability request.

Figure 3:
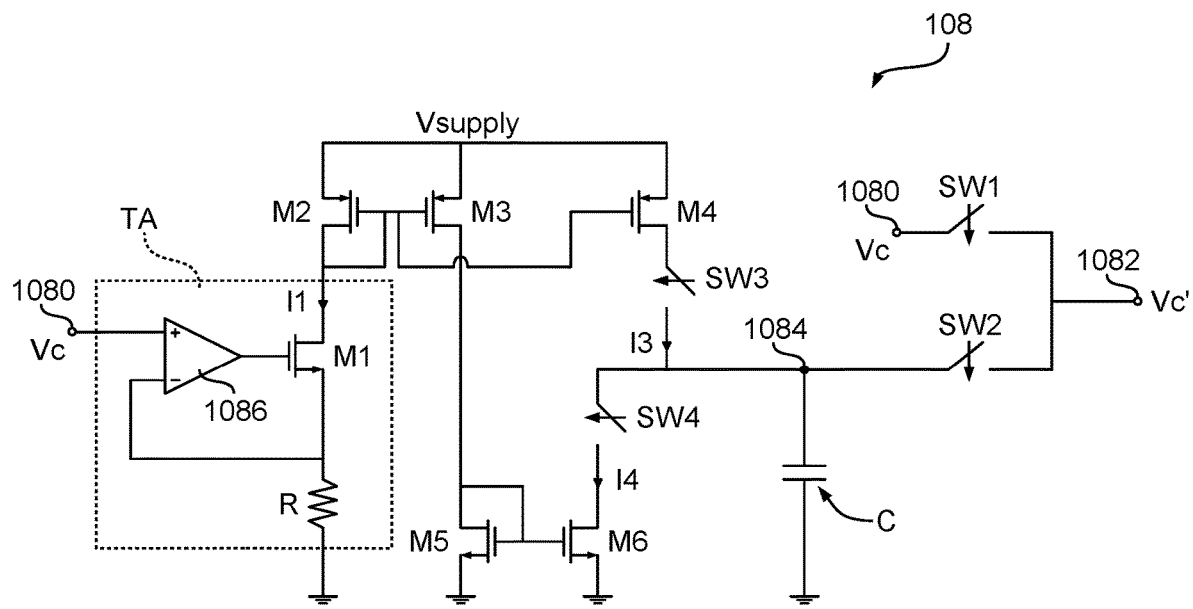
FIG. 3 is a circuit diagram exemplary of another circuit for managing state transitions in a multi-phase converter.

One or more embodiment as exemplified in FIG. 3 may provide improvements in this respect, providing duration of power-up and power-down transitions of the secondary phase(s) which are not related to a constant-slew ramp variation of Vc', but to a variable-slew ramp.

In particular, in one or more embodiments as exemplified in FIG. 3, the slew rate of the control signal Vc' during power-up and power-down transitions may be a function of (e.g., proportional to) the control voltage Vc itself. This may be obtained, for instance, by charging and/or discharging the capacitor C with a variable current generated as a function of the control voltage Vc.

In particular, FIG. 3 is exemplary of a possible circuit implementation for generating a charge/discharge current as a function of Vc, but other implementations may be possible.

As exemplified in FIG. 3 (wherein elements and components similar to those illustrated in FIG. 2 have been indicated with similar reference numerals), during activation of a secondary phase of the converter 10 (i.e., with switches SW2 and SW3 closed and switches SW1 and SW4 opened), the capacitor C may be charged with a current I3 injected into node 1084, with the value of I3 being dependent on the value of the control voltage Vc.

In particular, a phase management circuit block 108 according to one or more embodiments may comprise a transconductance amplifier circuit arrangement TA (e.g., comprising an operational amplifier 1086, a transistor M1 and a resistor R arranged as illustrated in FIG. 3) configured as a voltage to current converter to generate a current I1 as function of the value of the control voltage Vc (e.g., proportional to Vc: I1=Vc/R). The current I1 generated by the transconductance amplifier TA may be mirrored by means of a current mirror circuit arrangement comprising transistors M2 and M4, thereby providing a current I3=n*I1=n*Vc/R, with n being the mirroring factor which depends on the dimensions of transistors M2 and M4.

Similarly, during deactivation of a secondary phase of the converter 10 (i.e., with switches SW2 and SW4 closed and switches SW1 and SW3 opened), the capacitor C may be discharged with a current I4 sunk from node 1084 whose value is dependent on the value of the control voltage Vc. The current I1 generated by the transconductance amplifier TA may be mirrored by means of current mirror circuit arrangements in cascade (e.g., a first current mirror comprising transistors M2, M3 and a second current mirror comprising transistors M5, M6), thereby providing a current I4=m*I1=m*Vc/R, with m being the mirroring factor which depends on the dimensions of transistors M2, M3, M5 and M6.

Therefore, one or more embodiments according to FIG. 3 may provide both power-up and power-down timings which are independent from the operating conditions of the converter device 10, insofar as they may be independent from the value of the control voltage Vc.

For instance, in case Vc is high, the current generated for controlling the slew-rate of Vc' (i.e., I3 or I4) may be consequently high, thereby compensating for the high value of Vc to be reached. In case Vc is low, the current generated for controlling the slew-rate of Vc' may be low, thereby compensating for the low value of Vc to be reached, resulting in power-up and power-down timings ($t_{up}$ and $t_{down}$, respectively) which are not dependent on the value of Vc, insofar as:

$$I_{cap} = C \cdot \frac{dV_{cap}}{dt}$$

$$I_3 \approx C \cdot \frac{V_C}{t_{up}} \to n \cdot \frac{V_C}{R} = C \cdot \frac{V_C}{t_{up}} \to t_{up} = C \cdot \frac{R}{n}$$

$$I_4 \approx C \cdot \frac{V_C}{t_{down}} \to m \cdot \frac{V_C}{R} = C \cdot \frac{V_C}{t_{down}} \to t_{down} = C \cdot \frac{R}{m}$$

In addition to being independent from Vc, such transition times $t_{up}$ and $t_{down}$ may be tuned by selecting the values of the resistor R and/or the values of the mirroring factors n and m, thereby facilitating setting the duration of the transitions of the converter device 10 to provide improved performance in terms of output current capability response and output voltage regulation.

In one or more embodiments, transition times $t_{up}$ and $t_{down}$ may be tuned "on-the-fly" by providing a variable capacitor C and/or a variable resistor R in the circuit of FIG. 3.

Again, it is noted that FIG. 3 provides a non-limiting example of a possible implementation of a circuit for generating a charge current I3 and/or a discharge current I4 dependent on the value of the control voltage Vc for providing a transition timing of a multi-phase converter device almost independent on Vc itself, and thus almost independent on the operating conditions of the converter device. Alternative implementations may be possible.

For instance, in one or more embodiments the value of the charge current I3 (e.g., flowing in transistor M4) and/or of the discharge current I4 (e.g., flowing in transistor M6) may be set by a digital controller, the digital controller being configured to sense the control signal Vc and select the values of the charge and discharge currents as a function thereof.

Therefore, one or more embodiments may provide the following advantages over prior solutions:
  possibility of generating a power-on/power-off timing of a secondary phase that is fixed and constant in different operating conditions, as a result of the charge/discharge current being dependent on (e.g., proportional to) the control voltage Vc; and
  possibility of selecting the power-on/power-off timing so to avoid variations of the output voltage and/or current capability issues:
  i) in order to avoid variations of the output voltage, a sufficiently long time may be selected to prevent ripple phenomena on the output voltage, and
  ii) in order to provide satisfactory output current capability, a sufficiently short time may be selected to prevent the converter from operating with insufficient output current capability.

The architecture of one or more embodiments as described herein may provide improved flexibility of use and may be used with different trigger signals to manage activation and deactivation of the second phase (or, in general, of a secondary phase), as for example:
  a signal provided by an output current sensor (e.g., a comparator circuit) configured to manage activation and deactivation of a secondary phase as a function of the output current requested by the application load,
  a signal provided by an input voltage sensor (e.g., a comparator circuit) configured to manage a secondary phase as a function of the converter input voltage,
  a signal provided by a control voltage (Vc) comparator configured to power-up or power-down a secondary phase as a function of a converter control voltage that is dependent on the converter behavior, and
  external trigger signals and/or other application-dependent signals.

As exemplified herein, a circuit (e.g., 108) may be configured to generate a secondary switching stage control signal (e.g., Vc') for a multi-phase converter device (e.g., 10) comprising a main switching stage (e.g., 100) and at least one secondary switching stage (e.g., 100'). Such a circuit may comprise:

an input node (e.g., 1080) configured to receive a control signal (e.g., Vc) for the main switching stage of the multi-phase converter device,
  an output node (e.g., 1082) configured to provide said secondary switching stage control signal for said at least one secondary switching stage of the multi-phase converter device,
  a first electronic switch (e.g., SW1) configured to couple the output node to the input node as a result of said at least one secondary switching stage being activated, and
  a second electronic switch (e.g., SW2) configured to couple the output node to a capacitive component (e.g., a capacitor C) during activation or de-activation of said at least one secondary switching stage.

The circuit may comprise first current generation circuitry configured to generate a first current (e.g., I3) for selectively (e.g., SW3) charging the capacitive component during activation of said at least one secondary switching stage, and second current generation circuitry configured to generate a second current (e.g., I4) for selectively (e.g., SW4) discharging the capacitive component during de-activation of said at least one secondary switching stage. The first current generation circuitry and the second current generation circuitry may be configured to generate at least one of said first current and said second current as a function of said control signal received at the input node.

As exemplified herein, the first current generation circuitry and the second current generation circuitry may be configured to generate said at least one of said first current and said second current proportional to said control signal.

As exemplified herein, the circuit may comprise:
  a transconductance amplifier arrangement (e.g., TA) coupled to the input node and configured to generate a control current (e.g., I1) as a function of the control signal received at the input node,
  a first current mirror circuit block (e.g., M2, M4) configured to mirror said control current to generate said first current, and
  a second current mirror circuit block (e.g., M2, M3, M5, M6) configured to mirror said control current to generate said second current.

As exemplified herein, the circuit may comprise a digital controller circuit block configured to sense said control signal and to set the value of at least one of said first current and said second current as a function of said control signal sensed.

As exemplified herein, a multi-phase converter device may comprise a main switching stage controllable by a main control signal and at least one secondary switching stage controllable by a respective control signal, wherein said at least one secondary switching stage is activatable to source current in parallel to said main switching stage. The multi-phase converter device may comprise at least one circuit according to one or more embodiments configured for generating said control signal for said at least one secondary switching stage as a function of said main control signal.

As exemplified herein, the multi-phase converter device may comprise a plurality of secondary switching stages and a plurality of circuits according to one or more embodiments configured for generating respective control signals for the secondary switching stages in the plurality of secondary switching stages.

As exemplified herein, a method of operating a circuit according to one or more embodiments or a multi-phase converter device according to one or more embodiments may comprise:

receiving at an input node of said circuit a control signal for the main switching stage of the multi-phase converter device, coupling the output node of said circuit to the input node of said circuit as a result of said at least one secondary switching stage being activated, coupling the output node of said circuit to a capacitive component during activation or de-activation of said at least one secondary switching stage, generating a first current for selectively charging the capacitive component during activation of said at least one secondary switching stage and a second current for selectively discharging the capacitive component during de-activation of said at least one secondary switching stage, and generating at least one of said first current and said second current as a function of said control signal received at the input node of said circuit.

Without prejudice to the underlying principles, the details and embodiments may vary, even significantly, with respect to what has been described by way of example only, without departing from the extent of protection.

The invention claimed is:

1. A control circuit configured to control operation of a multi-phase converter device which includes a main switching stage and a secondary switching stage, the control circuit comprising:
an input node configured to receive a main control signal for the main switching stage;
an output node configured to provide a secondary control signal for the secondary switching stage;
a first electronic switch configured to couple the output node to the input node following completion of activation of said secondary switching stage;
a second electronic switch configured to couple the output node to a capacitive component during a time period of activation of said secondary switching stage and during a time period of de-activation of said secondary switching stage;
a first current generation circuit configured to generate a first current for selectively charging the capacitive component during said time period of activation of said secondary switching stage; and
a second current generation circuit configured to generate a second current for selectively discharging the capacitive component during said time period of de-activation of said secondary switching stage.

2. The control circuit of claim 1, wherein the first current is generated as a function of the main control signal.

3. The control circuit of claim 2, wherein the first current is proportional to a voltage of the main control signal.

4. The control circuit of claim 1, wherein the second current is generated as a function of the main control signal.

5. The control circuit of claim 4, wherein the second current is proportional to a voltage of the main control signal.

6. The control circuit of claim 1, wherein the first current generated by the first current generation circuit is proportional to said main control signal and wherein the second current generated by the second current generation circuit is proportional to said main control signal.

7. The control circuit of claim 1, further comprising:
a transconductance amplifier coupled to said input node and configured to generate a control current as a function of said main control signal received at the input node; and wherein the first current generation circuit comprises a first current mirror circuit configured to mirror said control current to generate said first current; and
wherein the second current generation circuit comprises a second current mirror circuit block configured to mirror said control current to generate said second current.

8. The control circuit of claim 1, further comprising a digital controller circuit configured to sense said main control signal and set a value of at least one of said first current and said second current as a function of the sensed main control signal.

9. A multi-phase converter device, comprising:
a main switching stage controllable by a main control signal;
a secondary switching stage controllable by a secondary control signal;
wherein said secondary switching stage is activatable to source current in parallel to said main switching stage;
a control circuit, comprising:
an input node configured to receive the main control signal;
an output node configured to provide the secondary control signal;
a first electronic switch configured to couple the output node to the input node following completion of activation of said secondary switching stage;
a second electronic switch configured to couple the output node to a capacitive component during a time period of activation of said secondary switching stage and during a time period of de-activation of said secondary switching stage;
a first current generation circuit configured to generate a first current for selectively charging the capacitive component during said time period of activation of said secondary switching stage; and
a second current generation circuit configured to generate a second current for selectively discharging the capacitive component during said time period of de-activation of said secondary switching stage.

10. The multi-phase converter device of claim 9, wherein the first current is generated as a function of the main control signal.

11. The multi-phase converter device of claim 10, wherein the first current is proportional to a voltage of the main control signal.

12. The multi-phase converter device of claim 9, wherein the second current is generated as a function of the main control signal.

13. The multi-phase converter device of claim 12, wherein the second current is proportional to a voltage of the main control signal.

14. The multi-phase converter device of claim 9, wherein the first current generated by the first current generation circuit is proportional to said main control signal and wherein the second current generated by the second current generation circuit is proportional to said main control signal.

15. The multi-phase converter device of claim 9, further comprising:
a transconductance amplifier coupled to said input node and configured to generate a control current as a function of said main control signal received at the input node; and
wherein the first current generation circuit comprises a first current mirror circuit configured to mirror said control current to generate said first current; and wherein the second current generation circuit comprises a second current mirror circuit block configured to mirror said control current to generate said second current.

16. The multi-phase converter device of claim 9, further comprising a digital controller circuit configured to sense said main control signal and set a value of at least one of said first current and said second current as a function of the sensed main control signal.

17. A multi-phase converter circuit, comprising:
a main switching stage coupled to an output node and controlled for switching by a first pulse width modulation signal;
a secondary switching stage coupled to said output node and controlled for switching by a second pulse width modulation signal;
a first circuit configured to determine a difference between a voltage at the output node and a reference voltage and generate a first control voltage;
a first comparator configured to compare the first control voltage to a first ramp signal to generate said first pulse width modulation signal;
a second comparator configured to compare a second control voltage to a second ramp signal to generate said second pulse width modulation signal;
a second circuit configured to generate the second control voltage, wherein the second circuit causes a level of the second control voltage to gradually increase to a level of the first control voltage in response to a change of said secondary switching stage from a deactuated state to an actuated state;
wherein the second circuit comprises:
an output node for outputting the second control voltage;
a capacitor;
a first switch selectively coupling the capacitor to the output node in response to the change of said secondary switching stage from the deactuated state to the actuated state; and
a current source configured to generate a charging current applied to charge the capacitor in response to the change of said secondary switching stage from the deactuated state to the actuated state.

18. The circuit of claim 17, wherein the second circuit further comprises:
an input node receiving the first control voltage; and
a second switch selectively coupling the input node to the output node in response to gradually increasing level of the second control voltage to reaching the level of the first control voltage.

19. The circuit of claim 18, wherein the first switch is controlled to decouple the capacitor from the output node.

20. The circuit of claim 17, wherein the current source comprises a voltage to current converter circuit having an input configured to receive the first control voltage and an output generating the charging current as a function of the level of the first control voltage.

21. The circuit of claim 17, wherein the current source comprises a fixed current source generating the charging current.

22. The circuit of claim 17, wherein the current source comprises a variable current source generating the charging current proportional to the level of the first control voltage.

23. The circuit of claim 17, wherein the second circuit is further configured to cause the level of the second control voltage to gradually decrease from the level of the first control voltage in response to a change of said secondary switching stage from the actuated state to the deactuated state, said first switch selectively coupling the capacitor to the output node in response to the change of said secondary switching stage from the actuated state to the deactuated state, said second circuit further comprising an additional current source configured to generate a discharging current applied to discharge the capacitor in response to the change of said secondary switching stage from the actuated state to the deactuated state.

24. A multi-phase converter circuit, comprising:
a main switching stage coupled to an output node and controlled for switching by a first pulse width modulation signal;
a secondary switching stage coupled to said output node and controlled for switching by a second pulse width modulation signal;
a first circuit configured to determine a difference between a voltage at the output node and a reference voltage and generate a first control voltage;
a first comparator configured to compare the first control voltage to a first ramp signal to generate said first pulse width modulation signal;
a second comparator configured to compare a second control voltage to a second ramp signal to generate said second pulse width modulation signal;
a second circuit configured to generate the second control voltage, wherein the second circuit causes a level of the second control voltage to gradually decrease from a level of the first control voltage in response to a change of said secondary switching stage from an actuated state to a deactuated state;
wherein the second circuit comprises:
an output node for outputting the second control voltage;
a capacitor;
a first switch selectively coupling the capacitor to the output node in response to the change of said secondary switching stage from the actuated state to the deactuated state; and
a current source configured to generate a discharging current applied to discharge the capacitor in response to the change of said secondary switching stage from the actuated state to the deactuated state.

25. The circuit of claim 24, wherein the first switch is controlled to decouple the capacitor from the output node.

26. The circuit of claim 24, wherein the current source comprises a voltage to current converter circuit having an input configured to receive the first control voltage and an output generating the discharging current as a function of the level of the first control voltage.

27. The circuit of claim 24, wherein the current source comprises a fixed current source generating the discharging current.

28. The circuit of claim 24, wherein the current source comprises a variable current source generating the discharging current proportional to the level of the first control voltage.

* * * * *